(12) United States Patent  
Rao (10) Patent No.: US 12,115,439 B2
(45) Date of Patent: Oct. 15, 2024

(54) SYSTEM AND METHOD FOR USING FINGERPRINTS TO DETERMINE COMMANDS IN A VIDEO GAME (71) Applicant: NETEASE (HANGZHOU) NETWORK CO., LTD., Zhejiang (CN)

(72) Inventor: Feng Rao, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 255 days.

(21) Appl. No.: 17/598,926

(22) PCT Filed: Mar. 19, 2020

(86) PCT No.: PCT/CN2020/080273
§ 371 (c)(1),
(2) Date: Sep. 28, 2021

(87) PCT Pub. No.: WO2020/199937
PCT Pub. Date: Oct. 8, 2020

(65) Prior Publication Data
US 2022/0152476 A1 May 19, 2022

(30) Foreign Application Priority Data

Apr. 1, 2019 (CN) .......................... 201910256977.2

(51) Int. Cl.
A63F 13/42 (2014.01)
A63F 13/214 (2014.01)
(Continued)

(52) U.S. Cl.
CPC ............ A63F 13/214 (2014.09); A63F 13/42 (2014.09); G06F 3/041 (2013.01);
(Continued)

(58) Field of Classification Search
CPC ............................... A63F 13/42; A63F 13/214
See application file for complete search history.

(56) References Cited

U.S. PATENT DOCUMENTS 6,057,845 A * 5/2000 Dupouy .............. G06F 3/04883
382/187
2012/0216141 A1* 8/2012 Li ........................ G06V 30/347
715/780
(Continued)

FOREIGN PATENT DOCUMENTS

CN 105278859 A 1/2016
CN 106474738 A 3/2017
(Continued)

OTHER PUBLICATIONS

The International Search Report dated May 27, 2020 for PCT international application No. PCT/CN2020/080273.
(Continued)

Primary Examiner — Corbett B Coburn
(74) Attorney, Agent, or Firm — Qinghong Xu (57) ABSTRACT The present disclosure relates to an information processing method in a game, which is applied to a mobile terminal for displaying a human-computer interaction interface in a touch screen and includes: obtaining an input fingerprint of a touch medium by means of the touch screen, and calculating similarity between the input fingerprint and a target fingerprint, wherein a mapping relationship exists between target fingerprints and a optional virtual object (S110); in response to detecting that the similarity is greater than a threshold value, obtaining action information of the touch medium on the touch screen, and determining a target virtual object according to the action information (S120); and controlling the optional virtual object corresponding to the target fingerprint to attack the target virtual object (S130).

20 Claims, 4 Drawing Sheets (51) Int. Cl.
*G06F 3/041* (2006.01)
*G06F 3/04883* (2022.01)
*G06V 40/12* (2022.01)
*G06V 40/13* (2022.01)

(52) U.S. Cl.
CPC ...... *G06F 3/04883* (2013.01); *G06V 40/1306* (2022.01); *G06V 40/1365* (2022.01)

(56) References Cited

U.S. PATENT DOCUMENTS

| | | | | |
|---|---|---|---|---|
| 2016/0357281 | A1* | 12/2016 | Fleizach | H04N 3/155 |
| 2017/0010799 | A1* | 1/2017 | Yaron | G06F 3/04883 |
| 2018/0200623 | A1* | 7/2018 | Palikuqi | G06F 3/0238 |
| 2020/0341611 | A1* | 10/2020 | Xu | G06F 3/0488 |

FOREIGN PATENT DOCUMENTS

| | | | |
|---|---|---|---|
| CN | 107450812 | A | 12/2017 |
| CN | 107491261 | A | 12/2017 |
| CN | 107823884 | A | 3/2018 |
| CN | 109350964 | A | 2/2019 |
| CN | 109865285 | A | 6/2019 |

OTHER PUBLICATIONS

The 1st Office Action dated Oct. 23, 2019 for CN patent application No. 201910256977.2.

\* cited by examiner

SYSTEM AND METHOD FOR USING FINGERPRINTS TO DETERMINE COMMANDS IN A VIDEO GAME

CROSS-REFERENCE TO RELATED APPLICATIONS

The present disclosure claims is the 371 application of PCT Application No. PCT/CN2020/080273, filed on Mar. 19, 2020, which priority to Chinese Patent Application No. CN201910256977.2, entitled 'Method and Device for Processing Information in Game, Storage Medium and Electronic Device', filed on Apr. 1, 2019, the entireties of which are incorporated by reference.

TECHNICAL FIELD

The present disclosure relates to the field of game technology, and in particular to an information processing method in a game, apparatus, storage medium, and electronic equipment.

BACKGROUND

With the development of mobile communication technology, more and more mobile terminal games have emerged. In many games, game players need to control virtual characters to perform attack actions. Due to the limitations of hardware conditions and interaction methods, most of the control methods in games of traditional personal computer (PC) side cannot be transplanted to mobile terminal games, which also makes the control methods of selecting target operating object between mobile terminal games and traditional PC games are very different.

In the prior art, the patent document CN201510648839.0 discloses a method and system for recognizing input instructions based on finger features in games. The user's operation of tapping the screen with different fingers will automatically generate different game instructions, so that the game operation has diversity. The game instructions can include character movement instructions, character attack instructions, and character release skills instructions.

SUMMARY

According to a first aspect of the present disclosure, an information processing method in a game is provided. The information processing method in a game is applied to a mobile terminal displaying a human-computer interaction interface on a touch screen and includes acquiring an input fingerprint of a touch medium through the touch screen, and calculating similarity between the input fingerprint and a target fingerprint, wherein there is a mapping relationship existing between the target fingerprint and an optional virtual object; in response to detecting that the similarity is greater than a threshold, acquiring action information of the touch medium on the touch screen and determining a target virtual object according to the action information; and controlling the optional virtual object corresponding to the target fingerprint to attack the target virtual object.

According to a second aspect of the present disclosure, an information processing apparatus in a game is provided. The information processing apparatus in a game is applied to a mobile terminal displaying a human-computer interaction interface on a touch screen and includes a calculation component configured to acquire an input fingerprint of a touch medium through the touch screen, and calculate similarity between the input fingerprint and a target fingerprint, wherein there is a mapping relationship existing between the target fingerprint and an optional virtual object; an acquisition component configured to acquire action information of the touch medium on the touch screen and determining a target virtual object according to the action information, in response to detecting that the similarity is greater than a threshold; and a control component configured to control the optional virtual object corresponding to the target fingerprint to attack the target virtual object.

According to a third aspect of the present disclosure, a computer storage medium is provided, on which a computer program is stored, and when the computer program is executed by a processor, the information processing method in the game according to the first aspect is implemented.

According to a fourth aspect of the present disclosure, an electronic equipment is provided. The electronic equipment includes a processor; and a memory for storing instructions executable by the processor: wherein, the processor is configured to implement, by executing the instructions, the information processing method in the game according to the first aspect.

It should be understood that the above general description and the following detailed description in the present disclosure are only exemplary and explanatory, and cannot limit the present disclosure.

BRIEF DESCRIPTION OF THE DRAWINGS

The drawings herein are incorporated into the specification and constitute a part of the specification, show embodiments that conform to the disclosure, and are used together with the specification to explain the principles of the disclosure. Obviously, the drawings in the following description are only some embodiments of the present disclosure. For those of ordinary skill in the art, without paying any creative work, other drawings can also be obtained based on these drawings, wherein.

DETAILED DESCRIPTION

Exemplary embodiments will now be described more fully with reference to the accompanying drawings. However, the exemplary embodiments can be implemented in various forms and should not be construed as limited to the embodiments set forth herein. Instead, these embodiments are provided so that the disclosure will be thorough and complete, and will fully convey the concept of exemplary embodiments to those skilled in the art. The described features, structures, or characteristics may be combined in any suitable manner in one or more embodiments. In the following description, many specific details are provided to give a full understanding of the embodiments of the present disclosure. However, those skilled in the art will realize that the technical solutions of the present disclosure may be practiced without one or more of the specific details, or by using other methods, components, materials, devices, steps and the like. In other cases, well-known technical solutions are not shown or described in detail to avoid obscuring aspects of the present disclosure.

The terms 'a', 'an', 'the' and 'said' are used to indicate the presence of one or more elements/components etc.; the terms 'include' and 'have' are used to indicate open-ended inclusions and means that there have additional elements/components etc. in addition to the listed elements/components etc.; the terms 'first' and 'second' etc. are used only as marks, not the limitation to the number of objects.

In addition, the drawings are merely schematic illustrations of the present disclosure and are not necessarily drawn to scale. The same reference numerals in the drawings identify the same or similar parts, and thus repeated descriptions thereof will be omitted. Some of the block diagrams shown in the drawings indicate functional entities and do not necessarily have to correspond to physically or logically independent entities.

In the prior art, the patent document CN201510648839.0 discloses a method and system for recognizing input instructions based on finger features in games. The user's operation of tapping the screen with different fingers will automatically generate different game instructions, so that the game operation has diversity. The game instructions can include character movement instructions, character attack instructions, and character release skills instructions.

It can be seen that the above patent document only disclose that a virtual character can be triggered to perform an attack action by a preset fingerprint input, but does not specifically disclose a specific interactive control scheme, such as how to determine a attack execution virtual object and/or a attack target virtual object.

In the embodiments of the present disclosure, an information processing method in a game is first provided, which at least to a certain extent avoid the disadvantage in the information processing method in the game in the prior art that lacking of an interaction scheme for determining a attack execution virtual object and/or a attack target virtual object.

Figure 1:
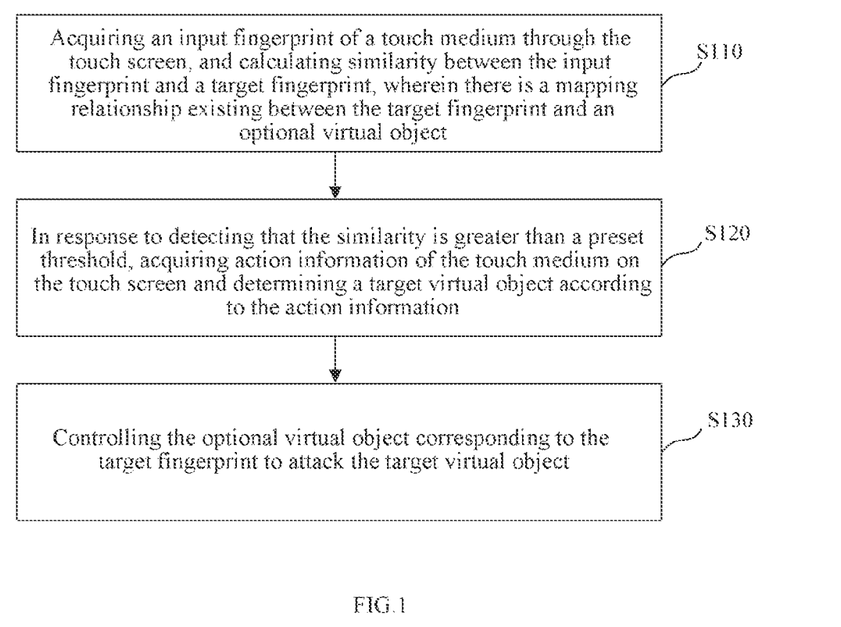
FIG. 1 shows a schematic flowchart of an information processing method in a game in an exemplary embodiment of the present disclosure.

FIG. 1 shows a schematic flowchart of an information processing method in a game in an exemplary embodiment of the present disclosure. The execution subject of the information processing method in a game may be a server that processes information in the game.

Referring to FIG. 1, the information processing method in the game according to an embodiment of the present disclosure includes the following steps.

In step S110, an input fingerprint of a touch medium is acquired through a touch screen, and similarity between the input fingerprint and a target fingerprint is calculated, wherein there is a preset mapping relationship between the target fingerprint and an optional virtual object.

In step S120, in response to detecting that the similarity is greater than a preset threshold, action information of the touch medium on the touch screen is acquired, and a target virtual object is determined based on the action information.

In step S130, the optional virtual object corresponding to the target fingerprint is controlled to attack the target virtual object.

In the technical solution provided by the embodiment shown in FIG. 1, on the one hand, the input fingerprint of the touch medium is acquired through the touch screen, and the similarity between the input fingerprint mentioned above and a target fingerprint is calculated, wherein there is a preset mapping relationship between the target fingerprint and an optional virtual object. Therefore, without displaying the optional virtual object on the screen, different respective optional virtual objects can be determined directly based on the acquired different input fingerprints, which reduces the screen occupation rate and improves the accuracy of the game operation. Furthermore, in response to detecting that the similarity is greater than the preset threshold, the action information of the touch medium on the touch screen is acquired, and the target virtual object is determined according to the action information, which solves the technical problem of lacking an interaction scheme for determining a target virtual object in the prior art. Furthermore, controlling the optional virtual object corresponding to the target fingerprint mentioned above to attack the target virtual object mentioned above solves the technical problem of lacking an interaction scheme for determining a attack execution virtual object (i.e., a virtual object who performs attack operations) in the prior art, and improves the convenience of game operations.

The specific implementation process of each step in FIG. 1 is described in detail below.

In an exemplary embodiment of the present disclosure, before acquiring one or more input fingerprints of the touch medium through the touch screen, one or more mapping relationships which exist between different target fingerprints and different optional virtual objects may be established.

In an exemplary embodiment of the present disclosure, the target fingerprint may be one or more fingerprints recorded in advance before formally getting into the game or entering a certain application software.

In the exemplary embodiment of the present disclosure, the optional virtual object may be any icon displayed on the game interface, for example, arm of the services in the game, such as an artillery, an infantry, an archer, etc.

In the exemplary embodiment of the present disclosure, for example, the user may be prompted to recording one or more target fingerprints before formally entering a game (or application software). A region where the target fingerprints are entered may be a preset specific region or any region on the touch screen. For example, the region where the target fingerprints are entered can be set according to actual conditions, which belongs to the protection scope of the present disclosure. After the target fingerprint recording is completed, a variety of optional virtual objects can be presented on the touch screen, and then the user is prompted to select the optional virtual object corresponding to the currently recorded target fingerprint. Therefore, the user can determine a mapping relationship between the target fingerprint and the optional virtual object according to their preferences. For example, the optional virtual object corresponding to index finger of the right hand can be established as the artillery, the optional virtual object corresponding to middle finger of the right hand can be established as the infantry, and the like. It should be noted that the specific corresponding relationship between the specific target fingerprint and the optional virtual object can be set according to the actual situation, and this disclosure does not specifically limit this. By establishing one or more mapping relationships which exist between different target fingerprints and different optional virtual objects, the selection of optional virtual object can be realized directly by inputting fingerprints, which improves the convenience of user operations and at same time solves the technical problems in the prior art, such as arranging the optional virtual objects on the screen in the form of icons causes a too-densed layout of the screen as well as user misoperations, thus the accuracy of user operations and screen utilization can be improved.

In the exemplary embodiment of the present disclosure, after the recording of one target fingerprint is completed and further an optional virtual object corresponding to the target fingerprint is determined, the user may also be prompted in an interactive question and answer mode whether to continue to record the next target fingerprint. If the user chooses to continue recording, the above steps can be repeated until all target fingerprints and optional virtual objects corresponding to the respective target fingerprints are recorded. If the user chooses to end recording, the recording of the target fingerprint can be ended and the next process can be entered.

Continuing to refer to FIG. 1, in step S110, the input fingerprint of the touch medium is acquired through the touch screen, and similarity between the input fingerprint and the target fingerprint is calculated, wherein there is a preset mapping relationship between the target fingerprint and the optional virtual object.

In the exemplary embodiment of the present disclosure, the touch screen is an electronic screen installed on an electronic terminal or electronic product, for example, an electronic screen of a mobile phone, a computer, ipad, a smart watch, etc. By touching the touch screen, the control of the operation of electronic equipment and the display of the human-computer interaction interface can be realized.

In the exemplary embodiment of the present disclosure, the touch medium is a movable entity that contacts a touch screen to generate a touch operation. For example, the touch medium may be a user's finger.

In an exemplary embodiment of the present disclosure, the input fingerprint may be a fingerprint of the touch medium (a user's finger) entered through the touch screen after user entering a game or application software. After acquiring the input fingerprint, the input fingerprint can be compared with a pre-recorded target fingerprint, and similarity between the input fingerprint and the target fingerprint can be calculated. For example, in case that one target fingerprint is recorded in advance, the similarity between the input fingerprint above and said target fingerprint is calculated, and then the calculated similarity is only one, for example, 99%. In case that a plurality of target fingerprints are recorded in advance, for example, if 3 target fingerprints are recorded in advance, the input fingerprint above can be compared with said 3 target fingerprints to calculate three similarities, for example: 20%, 90%, 95%.

In step S120, in response to detecting that the similarity is greater than the preset threshold, the action information of the touch medium on the touch screen is acquired, and the target virtual object is determined according to the action information.

In the exemplary embodiment of the present disclosure, referring to the related explanation of step S110, in case that the number of pre-recorded target fingerprints is one, the similarity is calculated, if the calculated similarity is greater than the preset threshold, a target fingerprint corresponding to the input fingerprint and an optional virtual object corresponding to the input fingerprint can be determined based on the similarity above. For example, in case that the calculated similarity is 99%, when the preset threshold is 90%, it can be judged that the above-mentioned similarity is greater than the preset threshold, and then the target fingerprint corresponding to the 99% similarity can be determined as a target fingerprint corresponding to input fingerprint, and the optional virtual object corresponding to the target fingerprint above is determined as an optional virtual object corresponding to the input fingerprint.

In the exemplary embodiment of the present disclosure, in case that the plurality of target fingerprints are pre-recorded, referring to the related explanation of step S110, the calculated similarities are 20%, 90%, and 95%. When the preset threshold is 90%, it can be seen that 95% is greater than 90%. Therefore, the target fingerprint corresponding to 95% similarity can be determined as a target fingerprint corresponding to the input fingerprint, and the optional virtual object corresponding to the target fingerprint above can be determined as an optional virtual object corresponding to the input fingerprint.

In the exemplary embodiment of the present disclosure, continue to refer to step S110 and related explanations of the above steps. After a similarity value is calculated, the similarity value that is less than or equal to the preset threshold can be discarded. For example, referring to the relevant explanation of the above steps, when the number of pre-recorded target fingerprints is 3 and the calculated 3 similarities are 20%, 90%, and 95% respectively, then it can be seen that 20% is less than the preset threshold of 90%, and 90% is equal to the preset threshold value of 90%, therefore, the similarity values 20% and 90% can be discarded. By discarding the input fingerprints whose similarity is less than or equal to the preset threshold, the interference of invalid fingerprints having low similarity with the target fingerprint on selecting the target virtual object is avoided. That is, after the invalid fingerprints having low similarity with the target fingerprint are determined, there is no need to further acquire the action information of the touch medium on the touch screen, which improves the efficiency and accuracy of determining the target virtual object.

In the exemplary embodiment of the present disclosure, for example, in case that determining the above-mentioned right index finger to be the target fingerprint corresponding to the input fingerprint, the "artillery" corresponding to the right index finger may be determined as the optional virtual object.

In the exemplary embodiment of the present disclosure, in response to detecting that the above-mentioned similarity is greater than the preset threshold, after the target fingerprint corresponding to the input fingerprint and the optional virtual object corresponding to the input fingerprint are determined according to the similarity, action information of the above-mentioned control medium on the touch screen can be acquired continuously.

In an exemplary embodiment of the present disclosure, the action information may be determined according to a change of trajectory of the input fingerprint on the touch screen within a preset time period. For example, a change of trajectory after the input fingerprint is in contact with the touch screen can be acquired within one second, and the action information can be determined according to the change of trajectory. For example, within one second, when acquiring that a contact time between the input fingerprint and the touch screen is 0.2 seconds, and the contact trajectory is one point and there is no other change of the trajectory except that point, then the action information can be determined as a tapping action. Within one second, when acquiring that a contact time between the input fingerprint and the touch screen is 0.2 seconds for the first time, and the contact trajectory is one point and after an interval of 0.1 seconds, acquiring that a contact time between the input fingerprint and the touch screen is 0.2 seconds and the contact trajectory is one point, and there is no other change of the trajectory apart from that, then the action information can be determined as a double-tapping action. Within one second, when acquiring that a contact time between the input fingerprint and the touch screen is 1 second, and the contact trajectory is one point and then the input fingerprint is moving from that point to another contact point, that is, the contact trajectory is changed from a point to a line, then the action information can be determined as a sliding action.

In the exemplary embodiment of the present disclosure, the action information may be tapping position information of a tapping action of the touch medium on the touch screen, or sliding-endpoint position information of a sliding action of the touch medium on the touch screen, or double-tapping action information of the touch medium on the touch screen.

In an optional embodiment, when the above-mentioned action information is tapping position information of the tapping action of the touch medium on the touch screen, the target virtual object may be determined according to the above-mentioned tapping position information. The tapping position information of the above tapping action can be the same as the position information of the input fingerprint. When there is an attacking object in the game (for example, a wild man, that is an object to be attacked in a game) at the tapping position of the above touch medium, the attacking object "savage" can be determined as the target virtual object. In this way, user can determine the optional virtual object (for example, a "soldier" that our camp can control) and the target virtual object with one tapping operation, and control the optional virtual object to attack the target virtual object, which can quickly and intuitively complete operations of selecting the soldier and attacking by the selected soldier.

In an optional embodiment, the above-mentioned action information may also be sliding-endpoint position information of the sliding action of the touch medium on the touch screen, that is, when the touch medium performs a sliding operation on the touch screen, the sliding-endpoint position information of the sliding operation can be acquired, and the target virtual object can be determined according to the sliding-endpoint position information, or the target virtual object can be determined according to the sliding trajectory (for example, it is determined that the virtual object within a preset range of the sliding trajectory to be the target virtual object). For example, when there is an attacking object in the game (for example, a wild man, that is an object to be attacked in a game) at the sliding-endpoint position of the above-mentioned touch medium, the attacking object "the wild man" may be determined as the target virtual object. In this way, a fingerprint input region can be set at a preset position of the screen, and the target virtual object can be determined through the sliding operation, and the game operations can be completed coherently.

In step S130, the optional virtual object corresponding to the target fingerprint is controlled to attack the target virtual object.

In the exemplary embodiment of the present disclosure, after the target virtual object is determined, when the tapping finger of the tapping action leaves the touch screen, the optional virtual object corresponding to the target fingerprint can be controlled to attack the above target virtual object. With reference to the related explanation of step S120, the aforementioned optional virtual object "artillery" can be controlled to attack the aforementioned target virtual object "the wild man".

In an exemplary embodiment of the present disclosure, after the target virtual object is determined, when the sliding finger of the sliding action leaves the touch screen, the optional virtual object corresponding to the target fingerprint can be controlled to attack the above target virtual object. With reference to the related explanation of step S120, the aforementioned optional virtual object "artillery" can be controlled to attack the aforementioned target virtual object "the wild man".

In the exemplary embodiment of the present disclosure, for example, when a double-tapping operation of the above touch medium is received, the above optional virtual object is controlled to stop attacking the above target virtual object. With reference to the relevant explanation of the above steps, the optional virtual object "artillery" can be controlled to stop attacking the target virtual object "the wild man".

Figure 2:
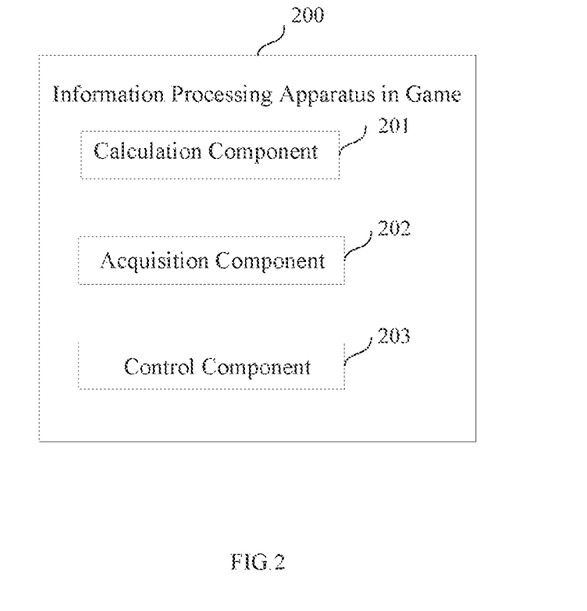
FIG. 2 shows a schematic structural diagram of an information processing apparatus in a game in one of the exemplary embodiments of the present disclosure.

The present disclosure also provides an information processing apparatus in a game. FIG. 2 shows a schematic structural diagram of an information processing apparatus in a game in one of the exemplary embodiments of the present disclosure. As shown in FIG. 2, the information processing apparatus in the game 200 may include a calculation component 201, an acquisition component 202, and a control component 203. The information processing apparatus in a game is applied to a mobile terminal displaying a human-computer interaction interface on a touch screen.

The calculation component 201 is configured to acquire an input fingerprint of a touch medium through the touch screen, and calculate similarity between the input fingerprint and a target fingerprint, and there is a preset mapping relationship existing between the target fingerprint and an optional virtual object.

In an exemplary embodiment of the present disclosure, the calculation component is configured to acquire the input fingerprint of the touch medium through the touch screen, and calculate similarity between the input fingerprint and the target fingerprint, and there is the preset mapping relationship existing between the target fingerprint and an optional virtual object.

The acquiring component 202 is configured to acquire action information of the touch medium on the touch screen and determining a target virtual object according to the action information, in response to detecting that the similarity is greater than a preset threshold.

In an exemplary embodiment of the present disclosure, the acquisition component is configured to acquire action information of the touch medium on the touch screen and determine the target virtual object according to the action information, in response to detecting that the similarity is greater than the preset threshold.

In an exemplary embodiment of the present disclosure, the acquisition component is further configured to acquire a contact trajectory between the touch medium and the touch screen within a preset time period, and determine action information according to the aforementioned contact trajectory.

In an exemplary embodiment of the present disclosure, the acquisition component is further configured to acquire tapping position information of the tapping action of the touch medium on the touch screen, wherein the tapping position information of the tapping action is the same as the position information of the input fingerprint; and determine the target virtual object according to the tapping position information of the tapping action of the touch medium on the touch screen.

In an exemplary embodiment of the present disclosure, the acquisition component is further configured to acquire the action information of the touch medium on the touch screen, and determine the target virtual object according to the sliding-endpoint position of the sliding action of the touch medium on the touch screen.

The control component 203 is configured to control the optional virtual object corresponding to the target fingerprint to attack the target virtual object.

In an exemplary embodiment of the present disclosure, the control component is configured to control the optional virtual object corresponding to the target fingerprint to attack the target virtual object.

In an exemplary embodiment of the present disclosure, the control component is further configured to control the optional virtual object to stop attacking the target virtual object, in case that the tapping action of the touch medium on the touch screen is double-tapping action.

The specific details of each component in the information processing apparatus in the above game have been described in detail in the corresponding information processing method in the game, so it will not be repeated here.

It should be noted that although several modules or units of the apparatus for action execution are described above, such division is not mandatory. In fact, according to the embodiments of the present disclosure, the features and functions of two or more modules or units described above may be embodied in one module or unit. Conversely, the features and functions of a module or unit described above can be further divided into multiple modules or units.

Furthermore, although various steps of the methods of the present disclosure are described in a particular order in the drawings, this does not imply that the steps must be performed in that particular order or that all of the steps shown must be performed to achieve a desired result. Additionally or alternatively, certain steps may be omitted, multiple steps may be combined into one step, and/or one step may be split into multiple steps, and so on.

Through the description of the foregoing embodiments, those skilled in the art can easily understand that the exemplary embodiments described herein can be implemented by software, or by software in combination with necessary hardware. Therefore, the technical solutions according to the embodiments of the present disclosure may be embodied in the form of a software product, which may be stored in a non-volatile storage medium (which may be a CD-ROM, a U disk, a mobile hard disk, and so on) or on a network. The software product may include instructions to cause a computing device (which may be a personal computer, a server, a mobile terminal, or a network device, and so on) to perform methods according to embodiments of the present disclosure.

In an exemplary embodiment of the present disclosure, there is also provided a computer-readable storage medium on which a program product capable of implementing the above method of the disclosure is stored. In some possible implementation manners, various aspects of the present disclosure may also be implemented in the form of a program product, including program code which, when being executed by a terminal device, causes the terminal device to implement steps of various exemplary embodiments described in the forgoing "detailed description" part of the specification.

Figure 3:
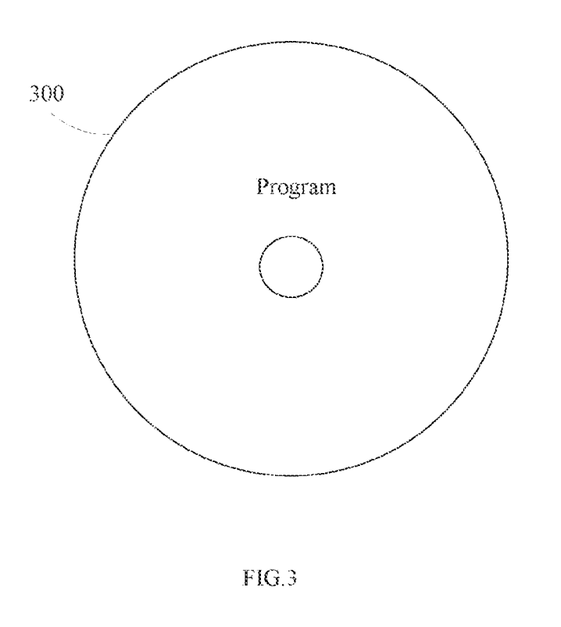
FIG. 3 shows a schematic structural diagram of a computer storage medium in one of the exemplary embodiments of the present disclosure.

Referring to FIG. 3, a program product 300 for implementing the above method according to an embodiment of the present disclosure is described. It may be implemented using a portable compact disk read-only memory (CD-ROM) and includes a program code, and may be executed by a terminal device, for example, a personal computer. However, the program product of the present disclosure is not limited thereto. In the disclosure, the readable storage medium may be any tangible medium containing or storing a program, which may be used by or in combination with an instruction execution system, apparatus, or device.

The program product may employ any combination of one or more readable medium. The readable medium may be a readable signal medium or a readable storage medium. The readable storage medium may be, for example but not limited to, an electrical, magnetic, optical, electromagnetic, infrared, or semiconductor system, apparatus, or device, or any combination thereof. More specific examples of readable storage medium (non-exhaustive list) may include: electrical connections with one or more wires, portable disks, hard disks, random access memory (RAM), read only memory (ROM), erasable programmable read-only memory (EPROM or flash memory), optical fiber, portable compact disk read-only memory (CD-ROM), optical storage device, magnetic storage device, or any suitable combination of the foregoing.

The computer-readable signal medium may include a data signal that is transmitted in baseband or as part of a carrier wave, in which readable program code is carried. This transmitted data signal can take many forms, including but not limited to electromagnetic signals, optical signals, or any suitable combination of the above. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, including but not limited to wireless, wired, optical fiber cable, RF, etc., or any suitable combination of the foregoing.

The program code for performing the operations of the present disclosure may be written in any combination of one or more programming languages, which may include an object oriented programming language, such as the Java and C++, or may include conventional formula programming language, such as "C" language or similar programming language. The program code may be entirely executed on the user computing device, partly executed on the user device, executed as an independent software package, partly executed on the user computing device and partly executed on a remote computing device, or entirely executed on the remote computing device or server. In situations involving a remote computing device, the remote computing device may be connected to the user computing device through any kind of network, including a local area network (LAN) or a wide area network (WAN), or may be connected to an external computing device (e.g., through a connection via internet using a internet service provider).

In an exemplary embodiment of the present disclosure, there is also provided an electronic equipment capable of implementing the above method.

Those skilled in the art can understand that various aspects of the present disclosure can be implemented as a system, a method, or program product. Therefore, various aspects of the present disclosure may be specifically implemented in the form of: a complete hardware implementation, a complete software implementation (including firmware, microcode, etc.), or a combination of hardware and software implementations, which may be collectively referred to herein as "circuit", "module" or "system".

An electronic equipment 400 according to an exemplary embodiment of the present disclosure is described below with reference to FIG. 4. The electronic equipment 400 shown in FIG. 4 is only an example, and should not impose any limitation on the functions and scope of use of the embodiments of the present disclosure.

Figure 4:
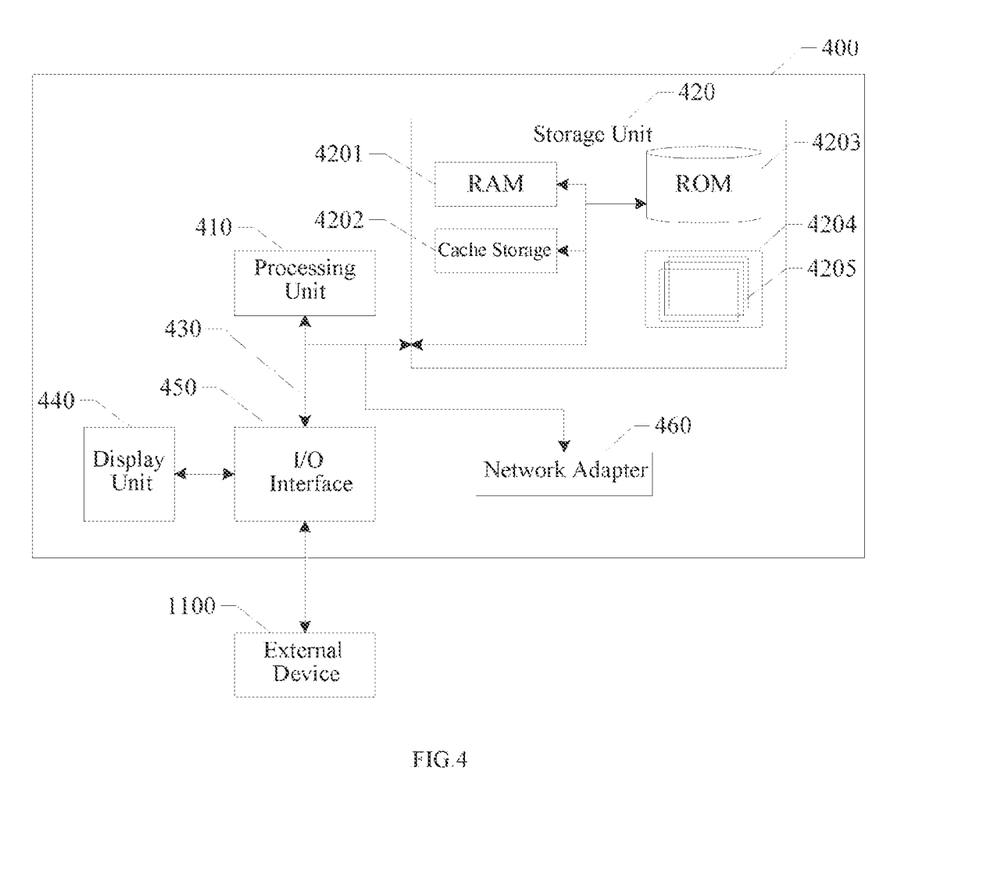
FIG. 4 shows a schematic structural diagram of an electronic equipment in one of the exemplary embodiments of the present disclosure.

As shown in FIG. 4, the electronic equipment 400 is shown in the form of a general-purpose computing device. The components of the electronic equipment 400 may include, but are not limited to, at least one processing unit 410, at least one storage unit 420, a bus 430 connecting different system components (including the storage unit 420 and the processing unit 410), and a display unit 440.

The storage unit stores program codes and the program codes can be executed by the processing unit 410, so that the processing unit 410 executes the steps of various exemplary embodiments according to the present disclosure described in the "exemplary methods" section of the present specification. For example, the processing unit 410 may perform the following steps shown in FIG. 1: at step S110, acquiring an input fingerprint of a touch medium through the touch screen, and calculating similarity between the input fingerprint and a target fingerprint, wherein there is a preset mapping relationship between the target fingerprint and an optional virtual object; at S120, in response to detecting that the similarity is greater than a preset threshold, acquiring action information of the touch medium on the touch screen and determining a target virtual object according to the action information; at S130, controlling the optional virtual object corresponding to the target fingerprint to attack the target virtual object.

The storage unit 420 may include a readable medium in the form of a volatile storage unit, such as a random access storage unit (RAM) 4201 and/or a cache storage unit 4202, and may further include a read-only storage unit (ROM) 4203.

The storage unit 420 may further include a program/utility tool 4204 having a set (at least one) of program modules 4205. Such program modules 4205 include, but are not limited to, an operating system, one or more application programs, other program modules, and program data. Each or some combination of these examples may include an implementation of a network environment.

The bus 430 may be one or more of several types of bus structures, including a memory unit bus or a memory unit controller, a peripheral bus, a graphics acceleration port, a processing unit, or a local area bus using any bus structure in a variety of bus structures.

The electronic equipment 400 may also communicate with one or more external devices 1100 (such as a keyboard, a pointing device, a Bluetooth device, etc.), and may also communicate with one or more devices that enable a user to interact with the electronic equipment 400, and/or may also communicate with any device (such as a router, a modem) that can enable the electronic equipment 400 to interact with one or more other computing devices. Such communication can be performed through an input/output (I/O) interface 450. Moreover, the electronic equipment 400 may also communicate with one or more networks (such as a local area network (LAN), a wide area network (WAN), and/or a public network, such as the Internet) through a network adapter 460. As shown in the figure, the network adapter 460 communicates with other modules of the electronic equipment 400 through the bus 430. It should be understood that although not shown in the figure, other hardware and/or software modules may be used in conjunction with the electronic equipment 400, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein can be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the methods according to exemplary embodiments of the present disclosure.

It can be seen from the above technical solutions that the information processing method in the game, the information processing apparatus in the game, the computer storage medium, and the electronic equipment in the exemplary embodiments of the present disclosure have at least the following advantages and positive effects.

In the technical solutions provided by some embodiments of the present disclosure, on the one hand, the input fingerprint of the touch medium is acquired through the touch screen, and the similarity between the input fingerprint mentioned above and a target fingerprint is calculated, wherein there is a preset mapping relationship existing between the target fingerprint and an optional virtual object. Therefore, without displaying the optional virtual object on the screen, different respective optional virtual objects can be determined directly based on the acquired different input fingerprints, which reduces the screen occupation rate and improves the accuracy of the game operation. Furthermore, when the similarity is greater than the preset threshold, the action information of the touch medium on the touch screen is acquired, and the target virtual object is determined according to the action information, which solves the technical problem of lacking an interaction scheme for determining a target virtual object in the prior art. Furthermore, controlling the optional virtual object corresponding to the target fingerprint mentioned above to attack the target virtual object mentioned above solves the technical problem of lacking an interaction scheme for determining a attack execution virtual object (i.e., a virtual object who performs attack operations) in the prior art, and improves the convenience of game operations.

In addition, the drawings are merely schematic descriptions of processes included in the methods according to exemplary embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in multiple modules, for example.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

What is claimed is:

1. An information processing method in a game, which is applied to a mobile terminal displaying a human-computer interaction interface on a touch screen, the information processing method in the game comprising:
   acquiring an input fingerprint of a touch medium through the touch screen, and calculating similarity between the input fingerprint and a target fingerprint to determine an optional virtual object according to the input fingerprint without displaying the optional virtual object on the touch screen, wherein there is a mapping relationship existing between the target fingerprint and the optional virtual object;
   in response to detecting that the similarity is greater than a threshold, acquiring action information of the touch medium on the touch screen and determining a target virtual object according to the action information, wherein the action information is determined according to a change of trajectory of the input fingerprint on the touch screen within a preset time period, and an attack virtual object within a preset range of the trajectory of the input fingerprint is determined as the target virtual object; and
   controlling the optional virtual object corresponding to the target fingerprint to attack the target virtual object.

2. The method according to claim 1, wherein the action information of the touch medium on the touch screen comprises tapping position information of a tapping action of the touch medium on the touch screen, wherein the tapping position information of the tapping action is the same as the position information of the input fingerprint;
   wherein the determining the target virtual object according to the action information comprises:
   determining the target virtual object according to the tapping position information of the tapping action of the touch medium on the touch screen.

3. The method according to claim 1, wherein the action information of the touch medium on the touch screen comprises sliding-endpoint position information of a sliding action of the touch medium on the touch screen;
   wherein the determining the target virtual object according to the action information comprises:
   determining the target virtual object according to the sliding-endpoint position information of the sliding action of the touch medium on the touch screen.

4. The method according to claim 1, wherein before acquiring the input fingerprint of the touch medium through the touch screen, the method further comprising:
   establishing the respective mapping relationship between different target fingerprints and different optional virtual objects.

5. The method according to claim 1, wherein acquiring the action information of the touch medium on the touch screen comprises:
   within a time period, acquiring a contact trajectory between the touch medium and the touch screen and determining the action information according to the contact trajectory.

6. The method of claim 1, wherein the method further comprising:
   when a tapping action of the touch medium on the touch screen is double-tapping action, controlling the optional virtual object to stop attacking the target virtual object.

7. The method according to claim 1, wherein the method further comprising:
   in response to detecting that the similarity is less than or equal to the threshold, discarding the input fingerprint.

8. A non-transitory computer storage medium on which a computer program is stored, and when the computer program is executed by a processor, an information processing method in the game is implemented,
   wherein the information processing method in the game is applied to a mobile terminal displaying a human-computer interaction interface on a touch screen and comprises:
   acquiring an input fingerprint of a touch medium through the touch screen, and calculating similarity between the input fingerprint and a target fingerprint to determine an optional virtual object according to the input fingerprint without displaying the optional virtual object on the touch screen, wherein there is a mapping relationship existing between the target fingerprint and the optional virtual object;
   in response to detecting that the similarity is greater than a threshold, acquiring action information of the touch medium on the touch screen and determining a target virtual object according to the action information, wherein the action information is determined according to a change of trajectory of the input fingerprint on the touch screen within a preset time period, and an attack virtual object within a preset range of the trajectory of the input fingerprint is determined as the target virtual object; and
   controlling the optional virtual object corresponding to the target fingerprint to attack the target virtual object.

9. The non-transitory computer storage medium according to claim 8, wherein the action information of the touch medium on the touch screen comprises tapping position information of a tapping action of the touch medium on the touch screen, wherein the tapping position information of the tapping action is the same as the position information of the input fingerprint;
   wherein the determining the target virtual object according to the action information comprises:
   determining the target virtual object according to the tapping position information of the tapping action of the touch medium on the touch screen.

10. The non-transitory computer storage medium according to claim 8, wherein the action information of the touch medium on the touch screen comprises sliding-endpoint position information of a sliding action of the touch medium on the touch screen;
    wherein the determining the target virtual object according to the action information comprises:
    determining the target virtual object according to the sliding-endpoint position information of the sliding action of the touch medium on the touch screen.

11. The non-transitory computer storage medium according to claim 8, wherein before acquiring the input fingerprint of the touch medium through the touch screen, the method further comprising:
    establishing the respective mapping relationship between different target fingerprints and different optional virtual objects.

12. The non-transitory computer storage medium according to claim 8, wherein acquiring the action information of the touch medium on the touch screen comprises:
    within a time period, acquiring a contact trajectory between the touch medium and the touch screen and determining the action information according to the contact trajectory.

13. The non-transitory computer storage medium according to claim 8, wherein the method further comprising:
when a tapping action of the touch medium on the touch screen is double-tapping action, controlling the optional virtual object to stop attacking the target virtual object.

14. An electronic equipment, comprising:
a processor; and
a memory for storing instructions executable by the processor;
wherein, the processor is configured to:
acquire an input fingerprint of a touch medium through the touch screen, and calculate similarity between the input fingerprint and a target fingerprint to determine an optional virtual object according to the input fingerprint without displaying the optional virtual object on the touch screen, wherein there is a mapping relationship existing between the target fingerprint and the optional virtual object;
in response to detecting that the similarity is greater than a threshold, acquire action information of the touch medium on the touch screen and determine a target virtual object according to the action information, wherein the action information is determined according to a change of trajectory of the input fingerprint on the touch screen within a preset time period, and an attack virtual object within a preset range of the trajectory of the input fingerprint is determined as the target virtual object; and
control the optional virtual object corresponding to the target fingerprint to attack the target virtual object.

15. The electronic equipment according to claim 14, wherein the action information of the touch medium on the touch screen comprises tapping position information of a tapping action of the touch medium on the touch screen, wherein the tapping position information of the tapping action is the same as the position information of the input fingerprint;
wherein the processor is configured to determine the target virtual object according to the tapping position information of the tapping action of the touch medium on the touch screen.

16. The electronic equipment according to claim 14, wherein the action information of the touch medium on the touch screen comprises sliding-endpoint position information of a sliding action of the touch medium on the touch screen;
wherein the processor is configured to determine the target virtual object according to the sliding-endpoint position information of the sliding action of the touch medium on the touch screen.

17. The electronic equipment according to claim 14, wherein before acquiring the input fingerprint of the touch medium through the touch screen, the processor is further configured to establish the respective mapping relationship between different target fingerprints and different optional virtual objects.

18. The electronic equipment according to claim 14, wherein the processor is configured to acquire, within a time period, a contact trajectory between the touch medium and the touch screen and determine the action information according to the contact trajectory.

19. The electronic equipment according to claim 14, the processor is further configured to control the optional virtual object to stop attacking the target virtual object, when a tapping action of the touch medium on the touch screen is double-tapping action.

20. The electronic equipment according to claim 14, wherein the processor is further configured to discard the input fingerprint, in response to detecting that the similarity is less than or equal to the threshold.

* * * * *